H. SALMON.
MACHINE FOR MANUFACTURING EXPANDED METAL.
APPLICATION FILED JAN. 9, 1911.

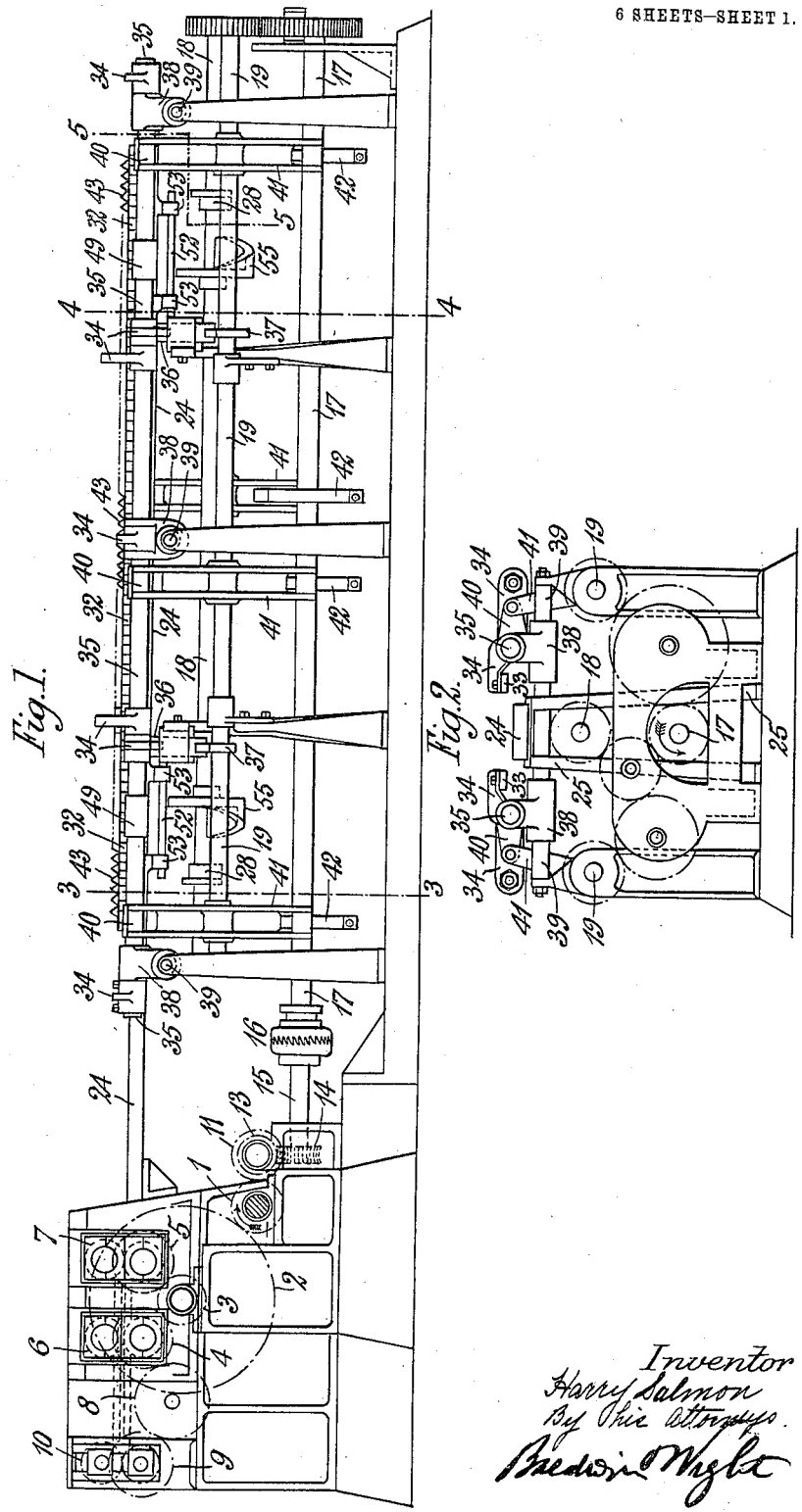

999,265.

Patented Aug. 1, 1911.
6 SHEETS—SHEET 2.

Witnesses
E. B. Franzoni
M. E. Burrell

Inventor
Harry Salmon
By his attorneys
Baldwin Wright

H. SALMON.
MACHINE FOR MANUFACTURING EXPANDED METAL.
APPLICATION FILED JAN. 9, 1911.
999,265.
Patented Aug. 1, 1911.
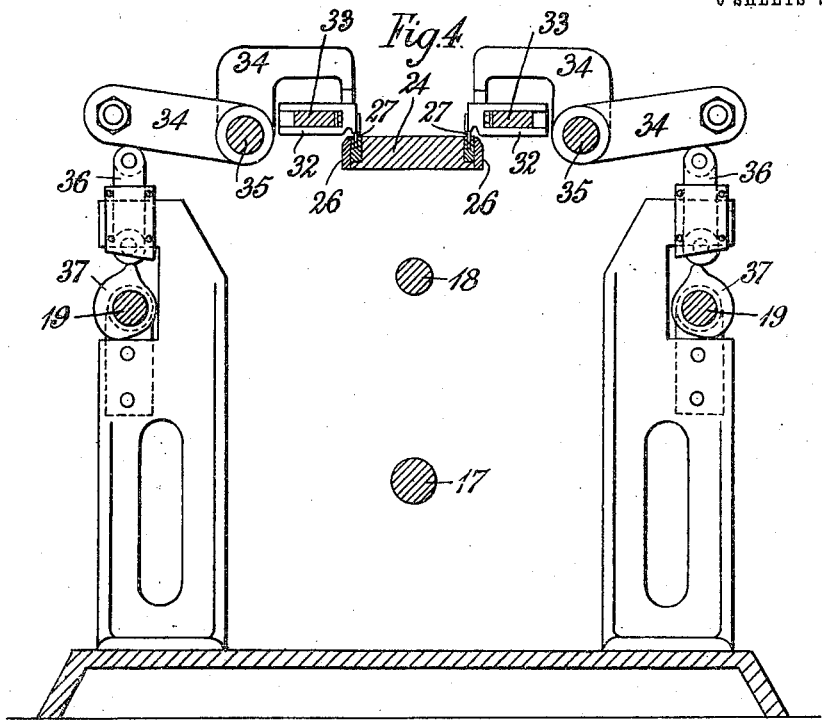
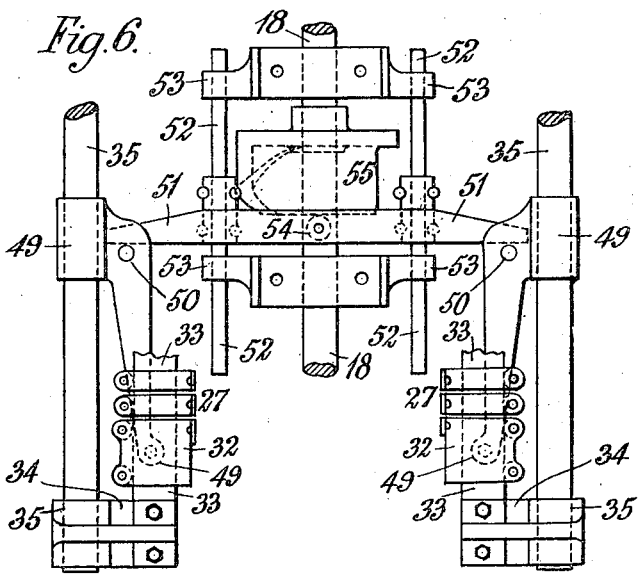

H. SALMON.
MACHINE FOR MANUFACTURING EXPANDED METAL.
APPLICATION FILED JAN. 9, 1911.
999,265.
Patented Aug. 1, 1911.
6 SHEETS—SHEET 4.
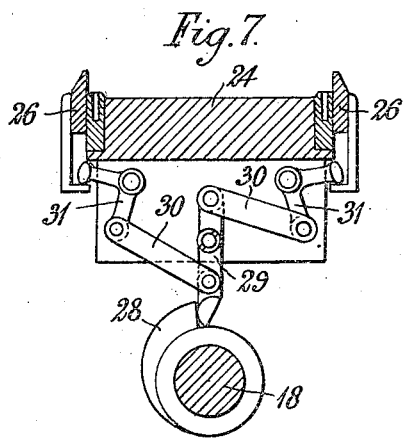
Fig. 7.
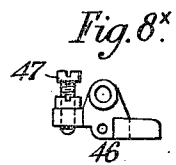
Fig. 8×
Fig. 9×
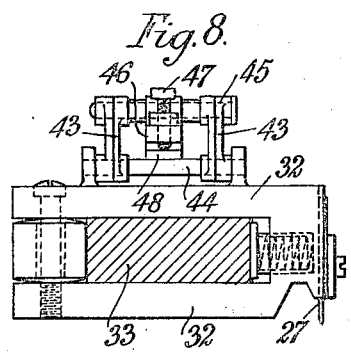
Fig. 8.
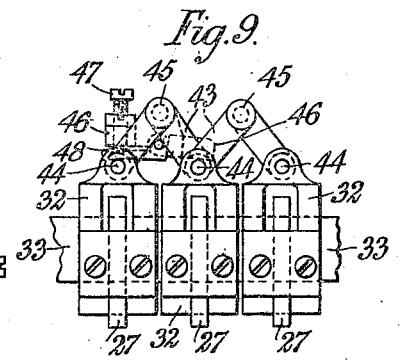
Fig. 9.
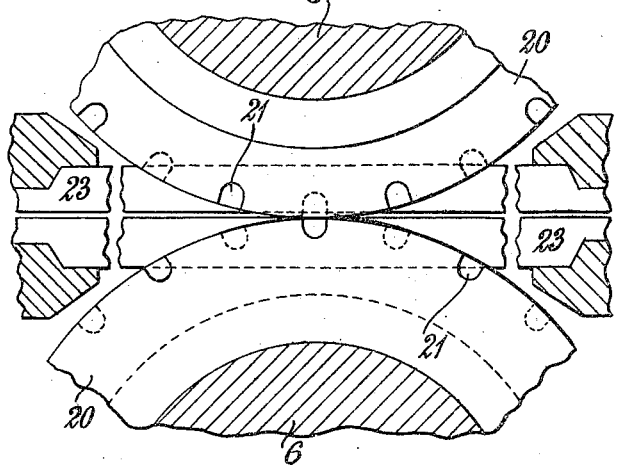
Fig. 10.
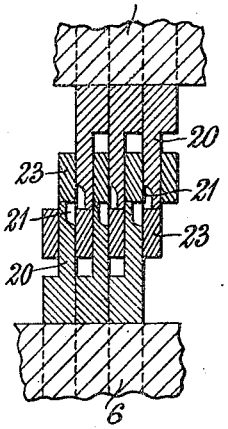
Fig. 11.
Witnesses
E. B. Franzoni
M. E. Burrell
Inventor
Harry Salmon
By his Attorneys
Bredin Wright

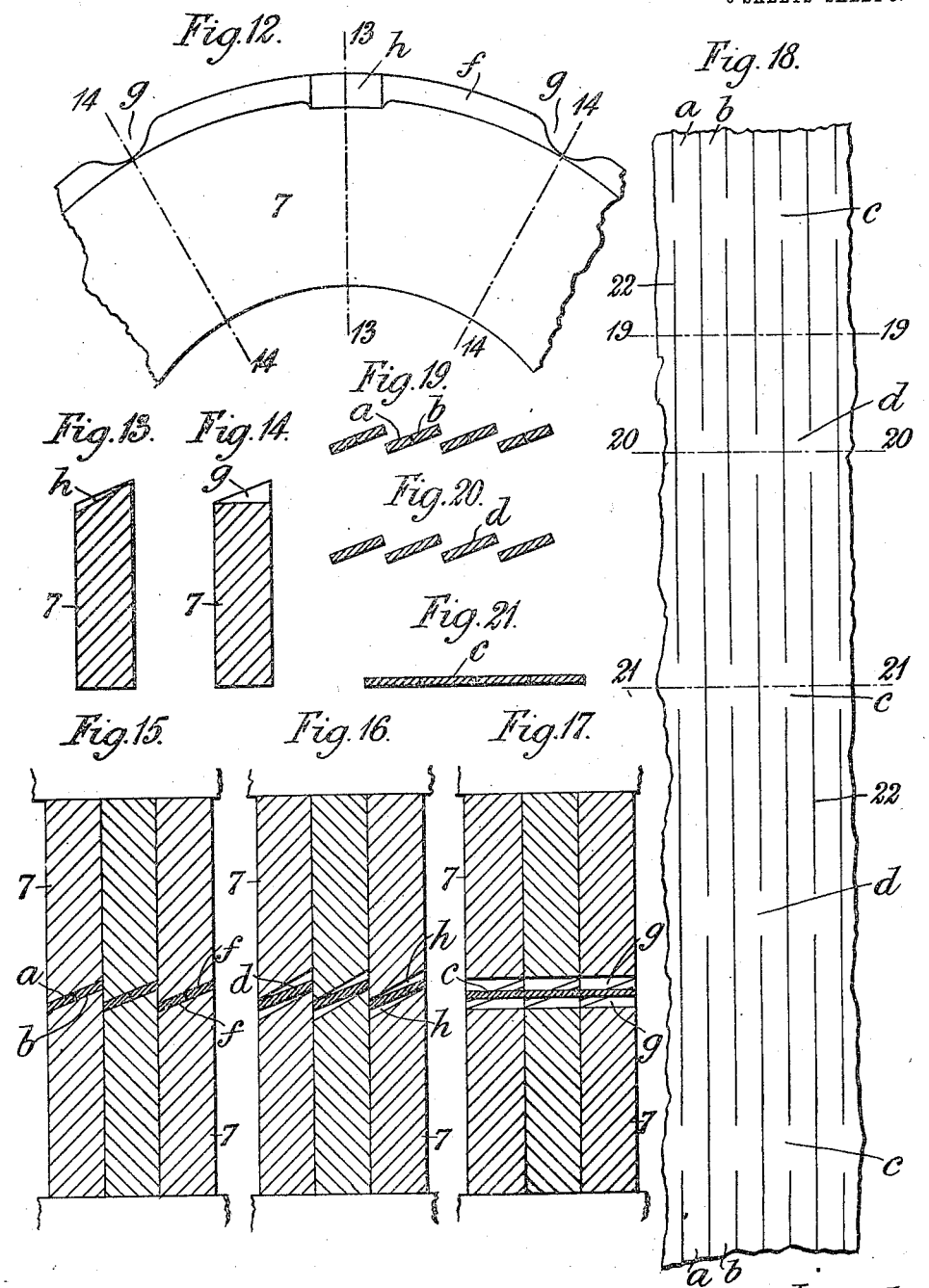

H. SALMON.
MACHINE FOR MANUFACTURING EXPANDED METAL.
APPLICATION FILED JAN. 9, 1911.

999,265.

Patented Aug. 1, 1911.
6 SHEETS—SHEET 6.

UNITED STATES PATENT OFFICE.

HARRY SALMON, OF WESTMINSTER, ENGLAND, ASSIGNOR TO THE EXPANDED METAL COMPANY, LIMITED, OF WESTMINSTER, ENGLAND.

MACHINE FOR MANUFACTURING EXPANDED METAL.

999,265.

Specification of Letters Patent.  Patented Aug. 1, 1911.

Application filed January 9, 1911. Serial No. 601,601.

*To all whom it may concern:*

Be it known that I, HARRY SALMON, a subject of the King of Great Britain, residing at York Mansion, York street, in the city of Westminster, England, have invented new and useful Improvements in Machines for Manufacturing Expanded Metal, of which the following is a specification.

According to this invention expanded metal is made by first forming in a sheet as is usual parallel longitudinal rows of slits the junctions between the ends of the slits of each row being between the slits of adjacent rows. The strips or strands so formed are according to this invention turned in pairs all in the same direction out of the plane of the sheet one strip being turned up and the adjacent one down, provision is however made so that every other row of junctions is turned as little as possible, the sheet is then expanded the mesh in its final condition being square or diamond shaped as desired. The strips may be turned out of the plane of the sheet by means of conical rolls having surfaces set all in the same direction out of the plane of the sheet and having recesses at the points of contact with the junctions.

The drawings show a machine suitable for carrying out the process.

The machine shown is similar in many respects to that illustrated in the United States Patent No. 890127 except that in place of the saw toothed rolls shown in that patent I use conical rolls having surfaces set all in the same direction out of the plane of the sheet to be rolled and having recesses at the points of contact with the junctions.

Figure 3:
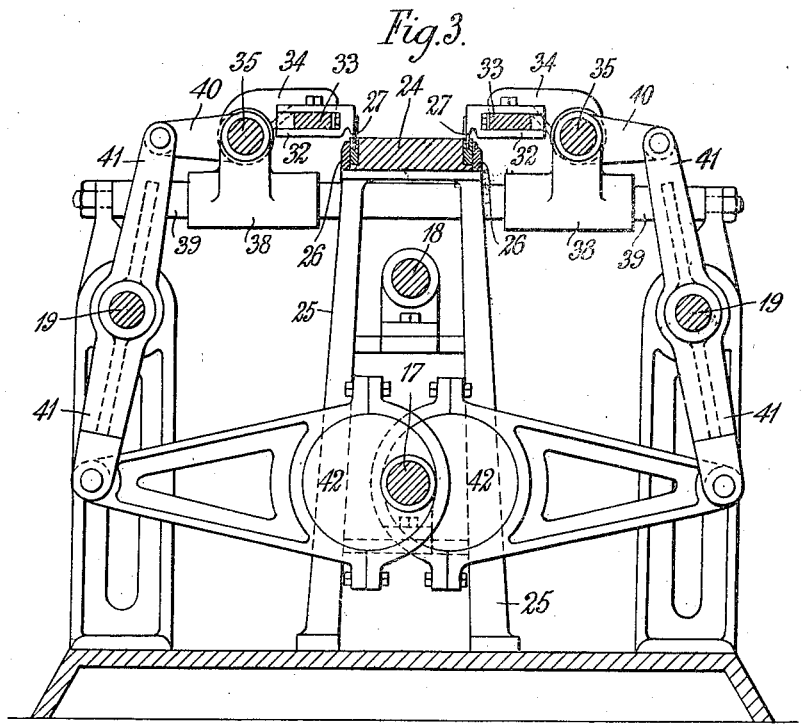
Figure 5:
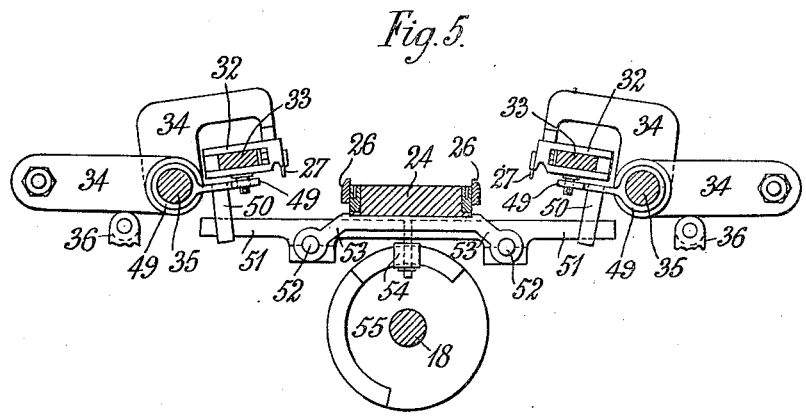
Figure 22:
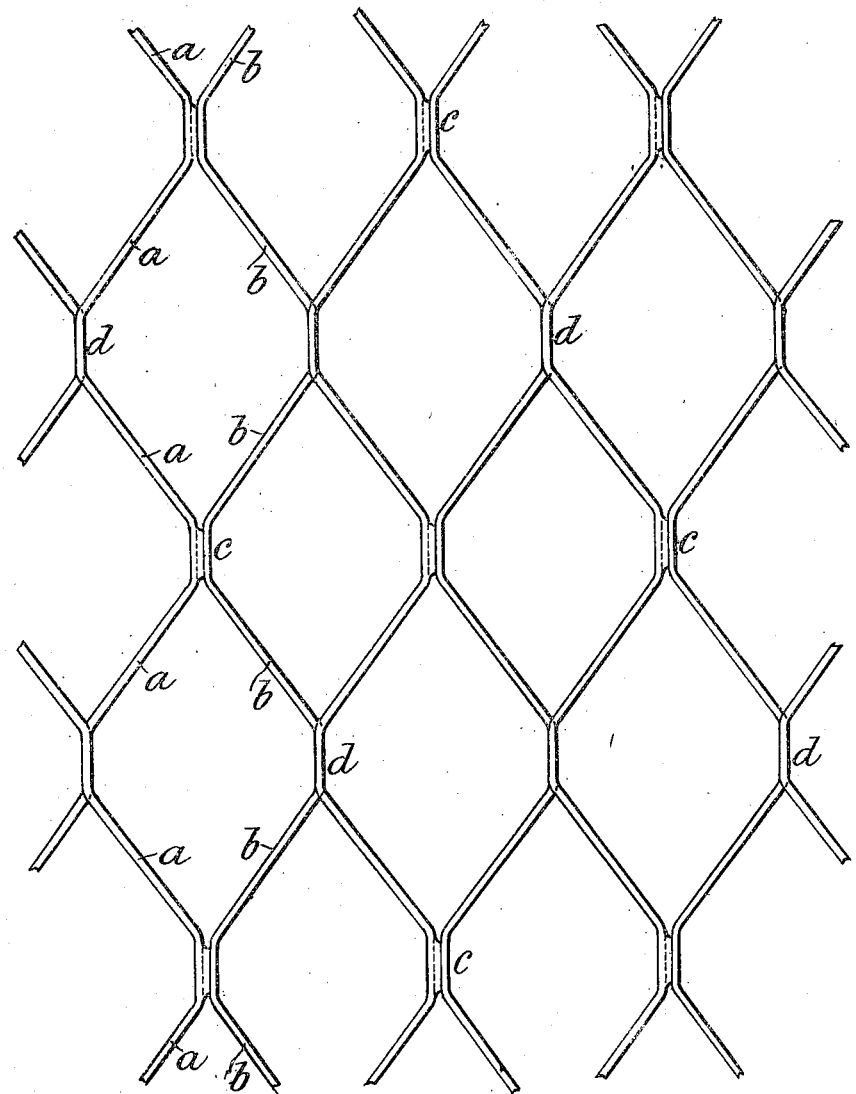
Figure 23:

Figure 1 is a side elevation, and Fig. 2 is an end elevation of a machine for embracing this invention. Figs. 3, 4 and 5 are transverse sections (to twice the scale of Figs. 1 and 2) on the lines 3—3, 4—4, and 5—5, Fig. 1. In these figures many parts are omitted for the sake of clearness. Fig. 6 is a local plan of Fig. 5. Figs. 7 and 8 are local transverse sections and Fig. 9 is a local side elevation showing details. Figs. 8* and 9* are detached views of some of the parts. Fig. 7 is four times and Figs. 8, 9, 8* and 9* are eight times the scale of Figs. 1 and 2. Figs. 10 and 11 are longitudinal and transverse sections of the slitting rolls 6, these figures are sixteen times the scale of Figs. 1 and 2. Fig. 12 is a side elevation of one of the conical rolls. Figs. 13 and 14 are sections on the lines 13—13 and 14—14 Fig. 12. Figs. 15, 16 and 17 are vertical sections of the conical rolls. Fig. 18 is a plan of the sheet after it has been slit. Figs. 19, 20 and 21 are transverse sections of the sheet shown in Fig. 18 on the lines 19, 20 and 21 after the sheet has been passed through the conical rolls and correspond with Figs. 15, 16 and 17. Fig. 22 is a plan and Fig. 23 is a transverse section of the sheet after it has been expanded.

1 (Fig. 1) is a toothed wheel fixed to the main shaft of the machine.

2 is a toothed wheel gearing with the wheel 1 and fixed to the same shaft as the wheel 3 which gears with wheels 4 and 5 fixed respectively to the shafts of one of the slitting rolls 6 and one of the conical rolls 7.

8 is a wheel gearing with the wheel 4 and also with the wheel 9 fixed to the shaft of one of the feed rolls 10. The wheel 1 also gears with a wheel 11 on the spindle of a worm 13 gearing with a worm wheel 14 on the longitudinal shaft 15. This shaft transmits motion through a clutch 16 to another longitudinal shaft 17. The shaft 17 drives through trains of gearing (clearly shown at Fig. 2) three longitudinal shafts 18, 19, 19, the four shafts actuating the expanding mechanism as hereinafter described.

The slitting rolls 6 are geared together by wheels (not shown) in the ordinary manner and as is clearly shown at Figs. 10 and 11 each slitting roll consists of a number of disks 20 separated from each other by the thickness of a disk, and the disks of one roll just enter the spaces between the disks of the other roll, thus forming a series of shear blades. The edges of the disks have notches 21 in them equally spaced around their circumferences, and situated alternately on opposite faces of them, and at these points the disks do not cut the metal sheet. The notches of one series are midway between the notches of the other series, so that the metal sheet after passing through the rolls has in it a number of parallel lines of slits 22 (Fig. 18) the sheet being divided by the slits into narrow strips $a\ b$, $a\ b$, &c., connected together by rectangular junctions $c\ d$, $c\ d$, &c., of uncut metal.

In order to prevent the sheet of metal sticking in the rolls 6 two parallel grids 23 (Figs. 10 and 11) are provided, the bars of which lie between the disks of the two rolls. There is a space between these two grids sufficient to allow the sheet of metal to pass. The conical rolls 7 are like the rolls 6 built up of parallel disks. Each of these disks have conical surfaces $f$ in which are recesses $g$ and $h$. The deep recesses $g$ in each pair of rolls coöperate together as is shown in Fig. 17 in passing the junctions $c$ at the ends of the pairs of strips, these junctions being turned as little as possible; and the shallow recesses $h$ coöperate together as is shown in Fig. 16 when passing the junctions $d$ connecting the middles of the pairs of strips.

The sheet of metal after leaving the conical rolls 7 is passed by hand to a guide trough and the clutch 16 is thrown in by a treadle thus starting the expanding mechanism. The guide trough is formed of a fixed table 24 supported by standards 25 and two movable sides 26 which are depressed out of the way when the jaws 27 descend to seize the edges of the sheet as is clearly shown at Fig. 7 by a cam 28 which acts on a lever 29 connected by links 30 to bell crank levers 31 which operate them. The sides 26 are brought back by springs which are not shown.

As shown at Fig. 4 the cams 37 have three lifts. When the slide 36 is on the highest lift (as shown at Fig. 4) the points of the jaws 27 penetrate through the edge of the unexpanded sheet of metal into holes in the edge of the table 24 but as the cam 37 revolves the slide 36 almost immediately descends onto the middle lift and the points of the jaws 27 are raised out of the holes and they are then free to move laterally away from the table. At the end of the expanding process the slides 36 descend onto the lowest lift of the cams 37 raising the jaws 27 still higher so that the sides 26 of the table 24 can be raised without coming into contact with the underside of the expanded sheet of metal thus allowing an unexpanded sheet to be slid into position on the table 24 while the expanded sheet is being knocked off the jaws 27.

The blocks 32 which carry the two series of jaws 27 (Figs. 8 and 9) for expanding the slit sheet are free to move on two parallel bars 33 carried by arms 34 fixed to two longitudinal rock shafts 35. The arms 34 are acted on by slides 36 and cams 37 (Fig. 4) which cause the bars 33 and jaws 27 to descend at the proper times, piercing through the edges of the sheet and entering slots in the edges of the table. The rock shafts 35 have fixed to them weighted arms (not shown) which tend to turn the shafts and keep the arms 34 in contact with the slides 36 and cause the jaws 27 to rise when they are free to do so. Immediately therefore the nose of the cam 37 has passed from beneath the slide 36 the jaws rise to the level of the top of the table and just clear of the slots in it thus retaining their hold on the sheet. The bearings of the shafts 35 are carried by blocks 38 free to move on transverse guides 39 (Fig. 3) and the shafts 35 are connected by links 40 to levers 41 acted upon by eccentrics 42 fixed on the shaft 17 which at the proper times draw the two series of jaws 27 transversely outward away from each other and so expand the slit sheet. The blocks 32 carrying the jaws of each series are connected to each other by links 43 acting somewhat like lazy tongs so that they are equidistant from each other when fully separated. The details of this arrangement are shown at Figs. 8, 9, 8* and 9*. The links 43 are in pairs their lower ends being pivoted to the blocks 32 by transverse pins 44 and their upper ends to transverse pins 45. Hung from the middle of the pins 45 are inverted T-shaped stops 46 (Fig. 8*) one end of which is forked while the other end carries a set screw 47, the end of which bears on a tongue 48 (Fig. 9*) pivoted near the bottom of the middle of the stop 46. Only one of these stops is shown in Fig. 9 but it will be understood that one is hung from each pin 45. When the blocks 32 are separated to the full extent the forked end of each stop rests on one of the pins 44 and the end of its tongue 48 rests on the next pin 44 lying between the arms of the forked end of the adjacent stop. When in this position the stop supports the pin 45 and prevents its further descent and therefore the further separation of the blocks 32. By turning the screws 47 the maximum distance between the blocks 32 can be adjusted.

The block 32 carrying the center jaw 27 of each series is fixed to the bar 33, the other blocks moving on the bar and closing up toward the central jaw when the sheet is being expanded. After a sheet has been expanded the blocks are separated again in the following manner:—The blocks at each end of each series are fixed to slides 49 (Figs. 5 and 6) free to move along the shafts 35. These slides carry pins 50 which engage with a bar 51 carrying guide rods 52 which work in guides 53 fixed to the underside of the table 24. The bar 51 has on its underside a roller 54 which is acted on by a cam 55 fixed on the shaft 18. When the sheet has been expanded, the jaws 27 rise as shown at Fig. 5 above the level of the table and the sheet being no longer supported by the latter drops off the jaws or is readily knocked off by hand, and then the cams 55 come into operation and push the end blocks 32 longitudinally outward away from the middle of the machine. The blocks then move transversely inward, the jaws 27 descend and take hold of the edges of the next sheet, the blocks 32 move transversely outward thus expanding the sheet, and at the same time the blocks move longitudinally inward toward the middle of the machine and so on.

It will be observed that the blocks 32 are only controlled by the cams 55 when they are being separated and the jaws therefore are not engaging with the slit sheet of metal. When the latter is being expanded the blocks are entirely free and their inward movement is entirely governed by the pull of the slit sheet in expanding, no undue strain therefore is put on any part of the sheet. This arrangement also allows the same machine to be used without alteration for different qualities of metal.

It will be observed that in the expanded sheet as is shown in Figs. 22 and 23 all the metal has been turned substantially through a right angle and that the rows of mesh are in parallel planes. The mesh shown is diamond shaped but it may be made square by further expansion.

In my concurrent application I have claimed the process of manufacture.

What I claim is:—

1. The combination of means for forming in a sheet of metal parallel longitudinal rows of slits, means for turning the adjacent strips on opposite sides of each alternate slit in the same direction out of the plane of the sheet and means for expanding the sheet.

2. The combination of means for forming in a sheet of metal parallel longitudinal rows of slits, means for turning the adjacent strips on opposite sides of each alternate slit in the same direction out of the plane of the sheet so that one strip is above the plane of the sheet and the other below the same and means for expanding the sheet.

3. The combination of means for forming in a sheet of metal parallel longitudinal rows of slits, means for turning the adjacent strips on opposite sides of each alternate slit and every other row of junctions out of the plane of the sheet without substantially turning other rows of junctions and means for expanding the sheet.

4. The combination of means for forming in a sheet of metal parallel longitudinal rows of slits, means for turning the adjacent strips on opposite sides of each alternate slit and every other row of junctions in the same direction out of the plane of the sheet so that one strip is above the plane of the sheet and the other below the same without substantially turning the other rows of junctions and means for expanding the sheet.

5. The combination of means for forming in a sheet of metal parallel longitudinal rows of slits, a pair of rolls having conical surfaces all making the same angle with the plane of the sheet and constructed to turn the adjacent strips on opposite sides of each alternate slit in the same direction out of the plane of the sheet and means for expanding the sheet.

6. The combination of means for forming in a sheet of metal parallel longitudinal rows of slits, a pair of rolls having conical surfaces all making the same angle with the plane of the sheet and constructed to turn the adjacent strips on opposite sides of each alternate slit in the same direction out of the plane of the sheet recesses in the rolls coöperating together when passing the junctions and means for expanding the sheet.

7. The combination of means for forming in a sheet of metal parallel longitudinal rows of slits, a pair of rolls having conical surfaces all making the same angle with the plane of the sheet and constructed to turn the adjacent strips on opposite sides of each alternate slit in the same direction out of the plane of the sheet alternate deep and shallow recesses in the rolls coöperating together when passing the junctions and means for expanding the sheet.

8. The combination of means for forming in a sheet of metal parallel longitudinal rows of slits, the junctions between the ends of the slits of each row being between the slits of adjacent rows, means for turning each junction of every other transverse row of junctions together with the pair of strips connecting it to the junctions of the adjacent transverse rows to an angle to the plane of the sheet, all such junctions being turned in the same direction, and means for expanding the sheet.

9. The combination of means for forming in a sheet of metal parallel longitudinal rows of slits, the junctions between the ends of the slits of each row being between the slits of adjacent rows, means for turning each junction of every other transverse row of junctions together with the pair of strips connecting it to the junctions of the adjacent transverse rows to an angle to the plane of the sheet, all such junctions being turned in the same direction while the junctions of the adjacent transverse rows remain substantially in the plane of the sheet, and means for expanding the sheet.

10. The combination of means for forming in a sheet of metal parallel longitudinal rows of slits, the junctions between the ends of the slits of each row being between the slits of adjacent rows, a pair of rolls, shallow recesses in the rolls which coöperate to turn in the same direction each junction of every other transverse row of junctions, conical surfaces on the rolls which turn the pair of strips connecting such junction to the junctions of the adjacent transverse rows to an angle to the plane of the sheet, deep recesses in the rolls which coincide when passing the latter junctions and means for expanding the sheet.

HARRY SALMON.

Witnesses:
HENRY SCHOLFIELD,
R. WESTACOTT.